(12) United States Patent
Akkarakaran et al.

(10) Patent No.: US 11,374,678 B2
(45) Date of Patent: *Jun. 28, 2022

(54) SYSTEMS AND METHODS FOR DYNAMIC SWITCHING BETWEEN WAVEFORMS ON DOWNLINK

(71) Applicant: QUALCOMM Incorporated, San Diego, CA (US)

(72) Inventors: Sony Akkarakaran, Poway, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 12 days.

This patent is subject to a terminal disclaimer.

(21) Appl. No.: 16/844,302

(22) Filed: Apr. 9, 2020

(65) Prior Publication Data

US 2020/0304229 A1  Sep. 24, 2020

Related U.S. Application Data

(63) Continuation of application No. 15/899,042, filed on Feb. 19, 2018, now Pat. No. 10,644,827.
(Continued)

(51) Int. Cl.
*H04L 1/00* (2006.01)
*H04W 76/27* (2018.01)
(Continued)

(52) U.S. Cl.
CPC .......... *H04L 1/0003* (2013.01); *H04L 1/0031* (2013.01); *H04L 5/0028* (2013.01);
(Continued)

(58) Field of Classification Search
None
See application file for complete search history.

(56) References Cited

U.S. PATENT DOCUMENTS 7,986,538 B2    7/2011  Harke
9,184,825 B2 *  11/2015  Kimura .................. H04B 7/155
(Continued)

FOREIGN PATENT DOCUMENTS

EP      1775901 A1      4/2007
WO      WO-2015018036 A1    2/2015
(Continued)

OTHER PUBLICATIONS

International Search Report and Written Opinion—PCT/US2018/018778—ISA/EPO—May 8, 2018.
(Continued)

*Primary Examiner* — Eunsook Choi
(74) *Attorney, Agent, or Firm* — QUALCOMM Incorporated

(57) ABSTRACT

Systems and methods providing for dynamic switching between the various waveforms on the downlink are described. Embodiments of a dynamic downlink waveform switching implementation may, for example, support utilization of one or more multiple carrier (MC) waveform (e.g., OFDMA) or other high peak to average power ratio (PAPR) waveform and one or more SC (SC) waveform (e.g., discrete Fourier transform-spread-orthogonal frequency division multiplexing (DFT-S-OFDM)) or other low PAPR waveform. Dynamic selection of a downlink waveform may be made by an access point based upon various metrics, including relative distance to a served an access terminal and the preference of downlink waveform indicated by a served an access terminal. A downlink waveform selection indication may be signaled from the access point to the served an access terminal using downlink control information (DCI).

30 Claims, 4 Drawing Sheets

Related U.S. Application Data

(60) Provisional application No. 62/482,564, filed on Apr. 6, 2017.

(51) Int. Cl.
*H04W 72/04* (2009.01)
*H04L 5/00* (2006.01)
*H04L 27/00* (2006.01)
*H04L 27/26* (2006.01)

(52) U.S. Cl.
CPC .......... *H04L 5/0069* (2013.01); *H04L 5/0092* (2013.01); *H04L 27/0008* (2013.01); *H04W 72/042* (2013.01); *H04W 76/27* (2018.02); *H04L 1/0009* (2013.01); *H04L 5/0007* (2013.01); *H04L 5/0008* (2013.01); *H04L 5/0016* (2013.01); *H04L 5/0023* (2013.01); *H04L 5/0058* (2013.01); *H04L 27/2614* (2013.01); *H04L 27/2626* (2013.01)

(56) References Cited

U.S. PATENT DOCUMENTS

| | | | |
|---|---|---|---|
| 2004/0162097 A1 | 8/2004 | Vijayan et al. | |
| 2005/0249110 A1 | 11/2005 | Huo et al. | |
| 2006/0159159 A1 | 7/2006 | Ogawa et al. | |
| 2008/0008151 A1* | 1/2008 | Li | H04W 72/1284 370/338 |
| 2008/0089437 A1 | 4/2008 | Frederiksen et al. | |
| 2010/0034152 A1* | 2/2010 | Imamura | H04L 5/0007 370/329 |
| 2010/0091900 A1 | 4/2010 | Gan | |
| 2010/0165943 A1* | 7/2010 | Kato | H04W 8/26 370/329 |
| 2011/0110323 A1* | 5/2011 | Kim | H04L 5/0069 370/329 |
| 2012/0250625 A1* | 10/2012 | Kim | H04L 5/0096 370/328 |
| 2014/0185530 A1 | 7/2014 | Kuchibhotla et al. | |
| 2014/0307645 A1* | 10/2014 | Ji | H04L 1/203 370/329 |
| 2015/0207606 A1 | 7/2015 | Ko et al. | |
| 2015/0215800 A1 | 7/2015 | Wu et al. | |
| 2018/0042043 A1* | 2/2018 | Babaei | H04L 5/0082 |
| 2018/0054269 A1* | 2/2018 | Cui | H04J 11/0036 |
| 2018/0063820 A1* | 3/2018 | Xiong | H04L 5/0094 |
| 2018/0279375 A1* | 9/2018 | Jeon | H04W 74/0833 |
| 2018/0294916 A1 | 10/2018 | Akkarakaran et al. | |
| 2019/0306863 A1* | 10/2019 | Tang | H04W 72/0453 |
| 2020/0083939 A1* | 3/2020 | Park | H04W 80/08 |

FOREIGN PATENT DOCUMENTS

| | | |
|---|---|---|
| WO | WO-2015018073 A1 | 2/2015 |
| WO | WO-2016171765 A1 | 10/2016 |

OTHER PUBLICATIONS

NTT Docomo Inc: "Mechanisms for Flexible Duplex", 3GPP Draft; R1-1612737, 3rd Generation Partnership Project (3GPP), Mobile Competence Centre; 650, Route Des Lucioles; F-06921 Sophia-Antipolis Cedex; France, vol. Ran WG1, No. Reno, USA; Nov. 14, 2016-Nov. 18, 2016 Nov. 13, 2016, XP051176680, Retrieved from the Internet: URL:http://www.3gpp.org/ftp/Meetings_3GPP_SYNC/RAN1/Docs/ [retrieved on Nov. 13, 2016], 5 pages.

Qualcomm Incorporated: "UL Waveform Configuration", 3GPP Draft; R1-1612075, 3RD Generation Partnership Project (3GPP), Mobile Competence Centre; 650, Route Des Lucioles; F-06921 Sophia-Antipolis Cedex; France, Vol. RAN WG1, No. Reno, USA; Nov. 13, 2016, XP051176035, Retrieved from the Internet: URL:http://www.3gpp.org/ftp/Meetings_3GPP_SYNC/RAN1/Docs/ and URL:http://www.3gpp.org/ftp/Meetings_3GPP_SYNC/RAN1/Docs/ [retrieved on Nov. 13, 2016], 6 pages.

Yang R., (Interdigital): "On the Single Carrier Waveforms for 11ay ; 11-16-1455-00-00ay-on-the-single-carrier-waveforms-for-11ay", IEEE Draft; 11-16-1455-00-00ay-on-the-single-carrier-waveforms-for-11ay, IEEE-SA Mentor, Piscataway, NJ USA, vol. 802.11 ay Nov. 8, 2016, XP068110877, Retrieved from the Internet: URL:https://mentor.ieee.org/802.11/dcn/16/11-16-1455-00-00ay-on-the-single-carrier-waveforms-for-11ay.pptx [retrieved on Nov. 8, 2016], pp. 1-14.

\* cited by examiner

SYSTEMS AND METHODS FOR DYNAMIC SWITCHING BETWEEN WAVEFORMS ON DOWNLINK

CROSS-REFERENCE TO RELATED APPLICATIONS

This application is a continuation of, and claims priority to, and commonly assigned U.S. patent application Ser. No. 15/899,042, entitled, "SYSTEMS AND METHODS FOR DYNAMIC SWITCHING BETWEEN WAVEFORMS ON DOWNLINK," filed on Feb. 19, 2018 and claims the benefit of priority to U.S. Provisional Patent Application No. 62/482,564, entitled, "SYSTEMS AND METHODS FOR DYNAMIC SWITCHING BETWEEN WAVEFORMS ON DOWNLINK," filed on Apr. 6, 2017, the disclosures of which are hereby incorporated by reference herein in their entirety as if fully set forth below and for all applicable purposes.

TECHNICAL FIELD

Aspects of the present disclosure relate generally to wireless communication systems, and more particularly, to wireless communication systems configured for operation using multiple waveforms for downlink communications. Certain embodiments of the technology discussed below can enable and provide dynamic switching between waveforms used with respect to downlink communications.

INTRODUCTION

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless communication technologies not only to meet the growing demand for mobile broadband access, but to advance and enhance the user experience with mobile communications.

Many wireless communication systems, for example, utilize orthogonal frequency-division multiplexing (OFDM) modulation techniques to provide orthogonal frequency-division multiple access (OFDMA) for simultaneously serving multiple UEs and/or other wireless nodes. For example, U.S. Pat. No. 8,422,434, issued Apr. 16, 2013 to Qualcomm Inc. describes embodiments wherein UEs receive downlinks on a multi-carrier communication system. As explained in the aforementioned patent, multi-carrier communication systems recognize that different terminals may be associated with different optimal transmit powers to achieve their desired received signal qualities. A respective UE may experience higher throughput with a higher or lower transmit power due to the UE's path loss, which may be effected by a UE's respective distance from the base station and/or other variables. Example multi-carrier communication systems may control respective power levels by adjusting the number of carriers assigned to UEs communicating via OFDM based on their respective transmit power needs.

Although, OFDMA waveforms are generally very good for median to high geometry UEs, and can support multiplexing a relatively large number of UEs, OFDMA waveforms may not provide the optimal waveform in all situations. For example, wireless network communications provided using OFDMA waveforms may not provide communication links suitable for serving the demand for broadband access and/or may fail to provide adequate user experience depending on the UE location and channel condition. In particular, OFDMA waveforms are generally high peak to average power ratio (PAPR) transmissions, such as may prevent driving the transmit power amplifiers (PAs) at higher power, and thus often are able to realize advantages in bandwidth and performance when the nodes communicating wirelessly are disposed in relatively near proximity.

BRIEF SUMMARY OF SOME EMBODIMENTS

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In one aspect of the disclosure, a method for dynamically switching downlink waveforms in a wireless communication system is provided. For example, the method can include determining, by logic of an access point serving an access terminal in the wireless communication system, whether to utilized a multiple carrier waveform or a single carrier waveform as a downlink waveform for data communication from the access point to the access terminal. The method can further include signaling, by the access point to the access terminal, an indication of the multiple carrier waveform or the single carrier waveform being selected for utilization as the downlink waveform for the data communication from the access point to the access terminal.

In an additional aspect of the disclosure, an apparatus configured for dynamically switching downlink waveforms in a wireless communication system is provided. For example, the apparatus can include means for determining, by an access point serving an access terminal in the wireless communication system, whether to utilized a multiple carrier waveform or a single carrier waveform as a downlink waveform for data communication from the access point to the access terminal. The apparatus can further include means for signaling, by the access point to the access terminal, an indication of the multiple carrier waveform or the single carrier waveform being selected for utilization as the downlink waveform for the data communication from the access point to the access terminal.

In another aspect of the disclosure, a non-transitory computer-readable medium having program code recorded thereon for dynamically switching downlink waveforms in a wireless communication system is provided. For example, the program code can include code to determine, by an access point serving an access terminal in the wireless communication system, whether to utilized a multiple carrier or a single carrier waveform as a downlink waveform for data communication from the access point to the access terminal. The program code can further include code to signal, by the access point to the access terminal, an indication of the multiple carrier waveform or the single carrier waveform being selected for utilization as the downlink waveform for the data communication from the access point to the access terminal.

In still another aspect of the disclosure, an apparatus configured for dynamically switching downlink waveforms in a wireless communication system is provided. The apparatus includes at least one processor and a memory coupled to the processor. The at least one processor can be configured to determine whether to utilized a multiple carrier waveform or a single carrier waveform as a downlink waveform for data communication from an access point to an access terminal in the wireless communication system. The at least one processor can further be configured to signal, from the access point to the access terminal, an indication of the multiple carrier waveform or the single carrier waveform being selected for utilization as the downlink waveform for the data communication from the access point to the access terminal.

In one aspect of the disclosure, a method for dynamically switching downlink waveforms in a wireless communication system is provided. For example, the method can include receiving, by an access terminal from an access point in the wireless communication system, an indication of a downlink waveform selection regarding whether to utilize a multiple carrier waveform or a single carrier waveform as a downlink waveform for data communication from the access point to the access terminal. The method can further include utilizing, by the access terminal, the multiple carrier waveform or the single carrier waveform corresponding to the indication of the downlink waveform selection as the downlink waveform for data communication from the access point to the access terminal.

In an additional aspect of the disclosure, an apparatus configured for dynamically switching downlink waveforms in a wireless communication system is provided. For example, the apparatus can include means for receiving, by an access terminal from an access point in the wireless communication system, an indication of a downlink waveform selection regarding whether to utilize a multiple carrier waveform or a single carrier waveform as a downlink waveform for data communication from the access point to the access terminal. The apparatus can further include means for utilizing, by the access terminal, the multiple carrier waveform or the single carrier waveform corresponding to the indication of the downlink waveform selection as the downlink waveform for data communication from the access point to the access terminal.

In another aspect of the disclosure, a non-transitory computer-readable medium having program code recorded thereon for dynamically switching downlink waveforms in a wireless communication system is provided. The program code can include code to receive, by an access terminal from an access point in the wireless communication system, an indication of a downlink waveform selection regarding whether to utilize a multiple carrier waveform or a single carrier waveform as a downlink waveform for data communication from the access point to the access terminal. The program code can further include code to utilize, by the access terminal, the multiple carrier waveform or the single carrier waveform corresponding to the indication of the downlink waveform selection as the downlink waveform for data communication from the access point to the access terminal.

In still another aspect of the disclosure, an apparatus configured for dynamically switching downlink waveforms in a wireless communication system is provided. The apparatus includes at least one processor and a memory coupled to the processor. The at least one processor can be configured to receive, by an access terminal from an access point in the wireless communication system, an indication of a downlink waveform selection regarding whether to utilize a multiple carrier waveform or a single carrier waveform as a downlink waveform for data communication from the access point to the access terminal. The at least one processor can further be configured to utilize, by the access terminal, the multiple carrier waveform or the single carrier waveform corresponding to the indication of the downlink waveform selection as the downlink waveform for data communication from the access point to the access terminal.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
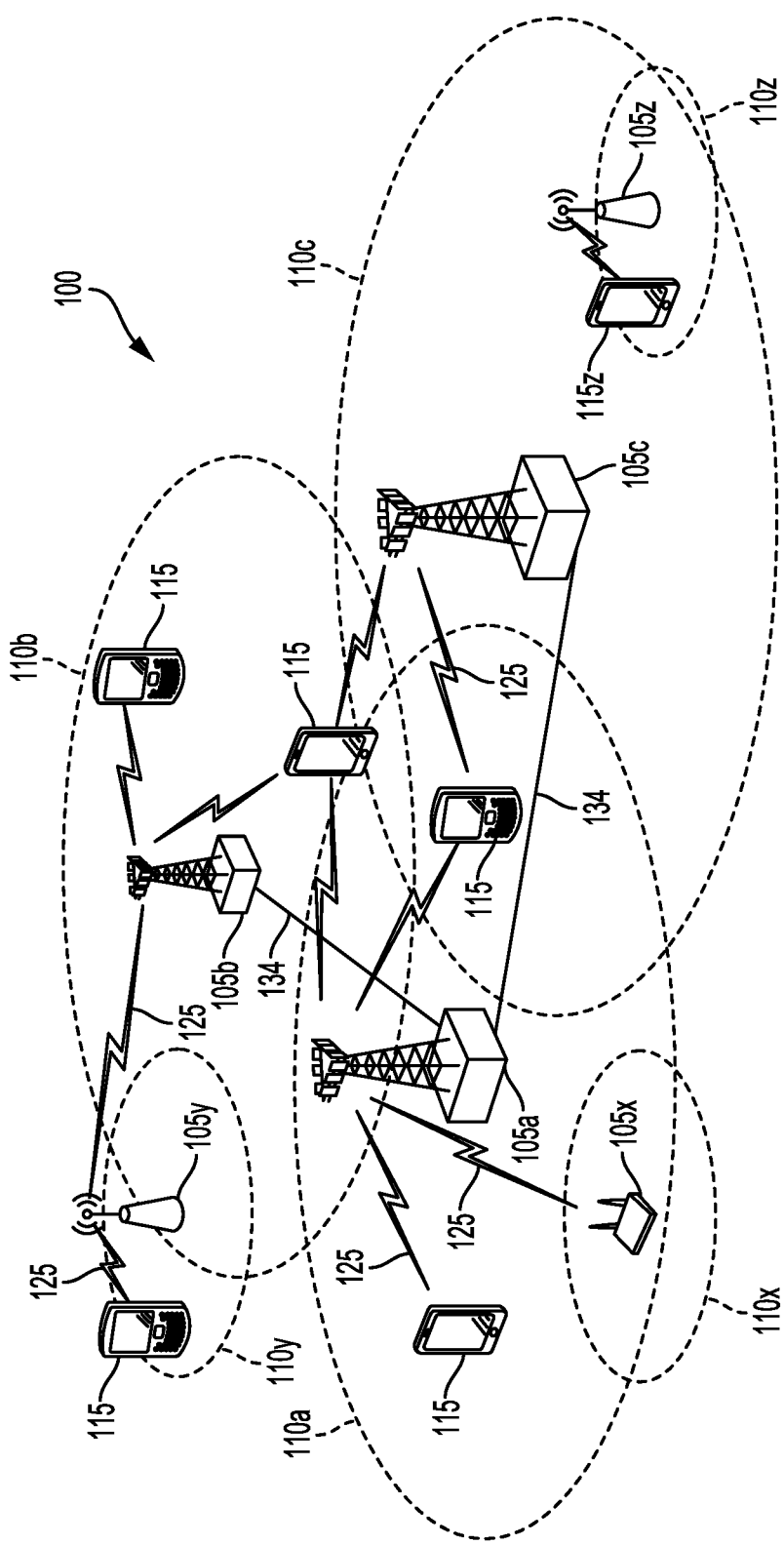
FIG. 1 is a block diagram illustrating details of a wireless communication system according to some embodiments of the present disclosure.

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in communication as between two or more wireless devices in one or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, as well as other communications networks. As described herein, the terms "networks" and "systems" may be used interchangeably according to the particular context.

A CDMA network, for example, may implement a radio technology such as universal terrestrial radio access (UTRA), cdma2000, and the like. UTRA includes wideband-CDMA (W-CDMA) and low chip rate (LCR). CDMA2000 covers IS-2000, IS-95, and IS-856 standards.

A TDMA network may, for example implement a radio technology such as Global System for Mobile Communications (GSM). 3GPP defines standards for the GSM EDGE (enhanced data rates for GSM evolution) radio access network (RAN), also denoted as GERAN. GERAN is the radio component of GSM/EDGE, together with the network that joins the base stations (for example, the Ater and Abis interfaces) and the base station controllers (A interfaces, etc.). The radio access network represents a component of a GSM network, through which phone calls and packet data are routed from and to the public switched telephone network (PSTN) and Internet to and from subscriber handsets, also known as user terminals or user equipments (UEs). A mobile phone operator's network may comprise one or more GERANs, which may be coupled with UTRANs in the case of a UMTS/GSM network. An operator network may also include one or more LTE networks, and/or one or more other networks. The various different network types may use different radio access technologies (RATs) and radio access networks (RANs).

An OFDMA network may, for example, implement a radio technology such as evolved UTRA (E-UTRA), IEEE 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project aimed at improving the universal mobile telecommunications system (UMTS) mobile phone standard. The 3GPP may define specifications for the next generation of mobile networks, mobile systems, and mobile devices.

For clarity, certain aspects of the apparatus and techniques may be described below with reference to exemplary LTE implementations or in an LTE-centric way, and LTE terminology may be used as illustrative examples in portions of the description below; however, the description is not intended to be limited to LTE applications. Indeed, the present disclosure is concerned with shared access to wireless spectrum between networks using different radio access technologies or radio air interfaces.

Moreover, it should be understood that, in operation, wireless communication networks adapted according to the concepts herein may operate with any combination of licensed or unlicensed spectrum depending on loading and availability. Accordingly, it will be apparent to one of skill in the art that the systems, apparatus and methods described herein may be applied to other communications systems and applications than the particular examples provided.

FIG. 1 shows wireless network 100 for communication according to some embodiments. While discussion of the technology of this disclosure is provided relative to an LTE-A network (shown in FIG. 1), this is for illustrative purposes. Principles of the technology disclosed can be used in other network deployments, including fifth generation (5G) networks. As appreciated by those skilled in the art, components appearing in FIG. 1 are likely to have related counterparts in other network arrangements including, for example, cellular-style network arrangements and non-cellular-style-network arrangements (e.g., device to device or peer to peer or ad hoc network arrangements, etc.).

Turning back to FIG. 1 wireless network 100 includes a number of base stations, such as may comprise evolved node Bs (eNBs) or G node Bs (gNBs). These may be referred to as eNBs 105. An eNB may be a station that communicates with the UEs and may also be referred to as a base station, a node B, an access point, and the like. Each eNB 105 may provide communication coverage for a particular geographic area. In 3GPP, the term "cell" can refer to this particular geographic coverage area of an eNB and/or an eNB subsystem serving the coverage area, depending on the context in which the term is used. In implementations of wireless network 100 herein, eNBs 105 may be associated with a same operator or different operators (e.g., wireless network 100 may comprise a plurality of operator wireless networks), and may provide wireless communications using one or more of the same frequencies (e.g., one or more frequency band in licensed spectrum, unlicensed spectrum, or a combination thereof) as a neighboring cell.

An eNB may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. In the example shown in FIG. 1, eNBs 105$a$, 105$b$ and 105$c$ are macro eNBs for the macro cells 110$a$, 110$b$ and 110$c$, respectively. eNBs 105$x$, 105$y$, and 105$z$ are small cell eNBs, which may include pico or femto eNBs that provide service to small cells 110$x$, 110$y$, and 110$z$, respectively. An eNB may support one or multiple (e.g., two, three, four, and the like) cells.

Wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. In some scenarios, networks may be enabled or configured to handle dynamic switching between synchronous or asynchronous operations.

UEs 115 are dispersed throughout wireless network 100, and each UE may be stationary or mobile. It should be appreciated that, although a mobile apparatus is commonly referred to as user equipment (UE) in standards and specifications promulgated by the 3rd Generation Partnership Project (3GPP), such apparatus may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. Within the present document, a "mobile" apparatus or UE need not necessarily have a capability to move, and may be stationary. Some non-limiting examples of a mobile apparatus, such as may comprise embodiments of one or more of UEs 115, include a mobile, a cellular (cell) phone, a smart phone, a session initiation protocol (SIP) phone, a laptop, a personal computer (PC), a notebook, a netbook, a smart book, a tablet, and a personal digital assistant (PDA). A mobile apparatus may additionally be an "Internet of things" (IoT) device such as an automotive or other transportation vehicle, a satellite radio, a global positioning system (GPS) device, a logistics controller, a drone, a multi-copter, a quad-copter, a smart energy or security device, a solar panel or solar array, municipal lighting, water, or other infrastructure; industrial automation and enterprise devices; consumer and wearable devices, such as eyewear, a wearable camera, a smart watch, a health or fitness tracker, a mammal implantable device, gesture tracking device, medical device, a digital audio player (e.g., MP3 player), a camera, a game console, etc.; and digital home or smart home devices such as a home audio, video, and multimedia device, an appliance, a sensor, a vending machine, intelligent lighting, a home security system, a smart meter, etc. A mobile apparatus, such as UEs 115, may be able to communicate with macro eNBs, pico eNBs, femto eNBs, relays, and the like. In FIG. 1, a lightning bolt (e.g., communication links 125) indicates wireless transmissions between a UE and a serving eNB, which is an eNB designated to serve the UE on the downlink and/or uplink, or desired transmission between eNBs. Although backhaul communication 134 is illustrated as wired backhaul communications that may occur between eNBs, it should be appreciated that backhaul communications may additionally or alternatively be provided by wireless communications.

Figure 2:
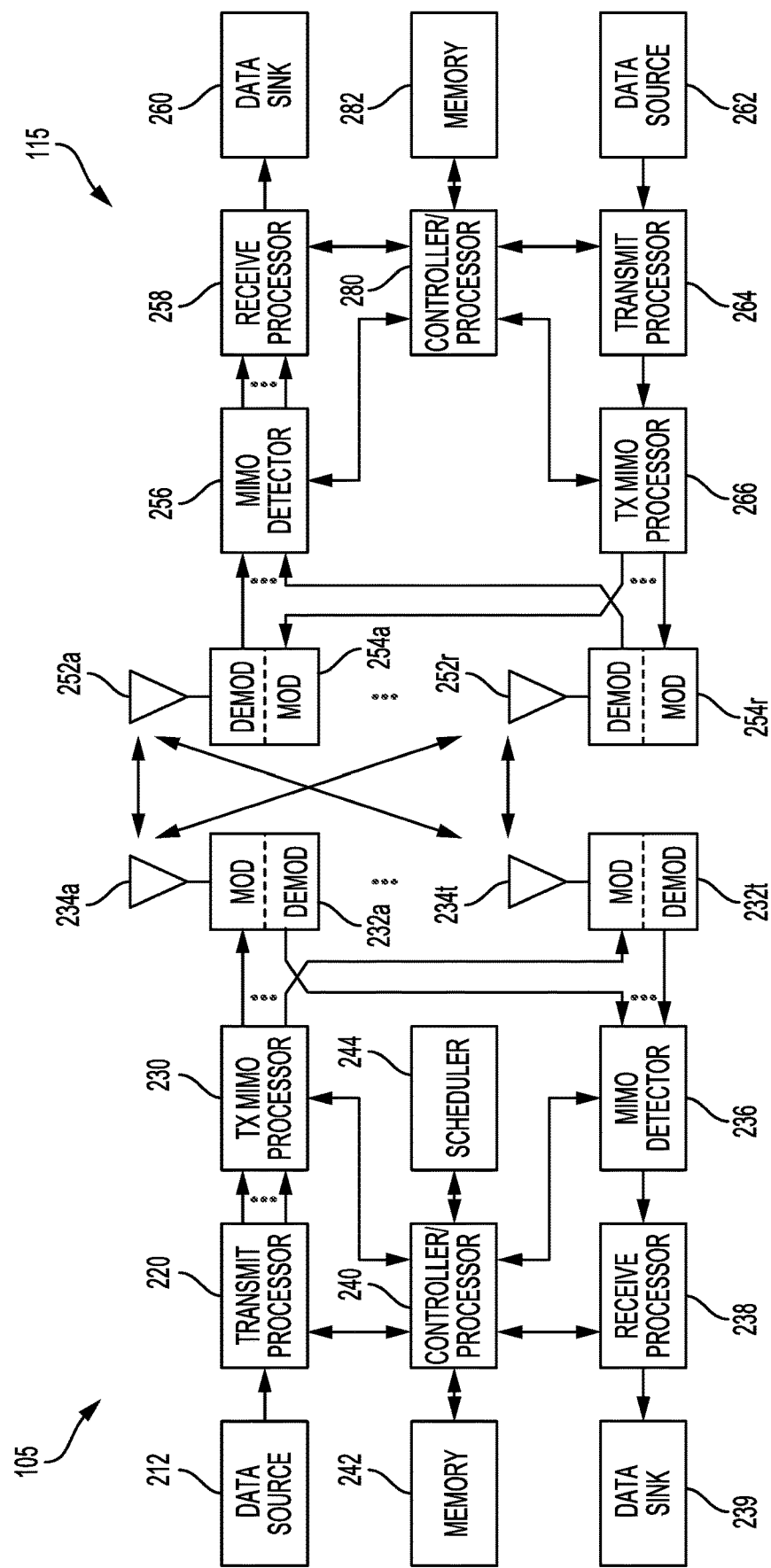
FIG. 2 is a block diagram conceptually illustrating a design of a base station/eNB and a UE configured according to some embodiments of the present disclosure.

FIG. 2 shows a block diagram of a design of base station/eNB 105 and UE 115. These can be one of the base stations/eNBs and one of the UEs in FIG. 1. For a restricted association scenario (as mentioned above), the eNB 105 may be small cell eNB 105$z$ in FIG. 1, and UE 115 may be UE 115$z$, which in order to access small cell eNB 105$z$, would be included in a list of accessible UEs for small cell eNB 105$z$. eNB 105 may also be a base station of some other type. eNB 105 may be equipped with antennas 234$a$ through 234$t$, and UE 115 may be equipped with antennas 252$a$ through 252$r$.

At eNB 105, transmit processor 220 may receive data from data source 212 and control information from controller/processor 240. The control information may be for the PBCH, PCFICH, PHICH, PDCCH, etc. The data may be for the physical downlink shared channel (PDSCH), etc. Transmit processor 220 may process (e.g., encode and symbol map) the data and control information to obtain data symbols and control symbols, respectively. Transmit processor 220 may also generate reference symbols, e.g., for the PSS, SSS, and cell-specific reference signal. Transmit (TX) multiple-input multiple-output (MIMO) processor 230 may perform spatial processing (e.g., precoding) on the data symbols, the control symbols, and/or reference symbols, if applicable, and may provide output symbol streams to modulators (MODs) 232$a$ through 232$t$. Each modulator 232 may process a respective output symbol stream (e.g., for OFDM, etc.) to obtain an output sample stream. Each modulator 232 may additionally or alternatively process (e.g., convert to analog, amplify, filter, and upconvert) the output sample stream to obtain a downlink signal. Downlink signals from modulators 232$a$ through 232$t$ may be transmitted via antennas 234$a$ through 234$t$, respectively.

At UE 115, antennas 252$a$ through 252$r$ may receive the downlink signals from eNB 105 and may provide received signals to demodulators (DEMODs) 254$a$ through 254$r$, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. MIMO detector 256 may obtain received symbols from all demodulators 254$a$ through 254$r$, perform MIMO detection on the received symbols if applicable, and provide detected symbols. Receive processor 258 may process (e.g., demodulate, deinterleave, and decode) the detected symbols, provide decoded data for UE 115 to data sink 260, and provide decoded control information to controller/processor 280.

On the uplink, at UE 115, transmit processor 264 may receive and process data (e.g., for the PUSCH) from data source 262 and control information (e.g., for the PUCCH) from controller/processor 280. Transmit processor 264 may also generate reference symbols for a reference signal. The symbols from transmit processor 264 may be precoded by TX MIMO processor 266 if applicable, further processed by modulators 254$a$ through 254$r$ (e.g., for SC-FDM, etc.), and transmitted to eNB 105. At eNB 105, the uplink signals from UE 115 may be received by antennas 234, processed by demodulators 232, detected by MIMO detector 236 if applicable, and further processed by receive processor 238 to obtain decoded data and control information sent by UE 115. Processor 238 may provide the decoded data to data sink 239 and the decoded control information to controller/processor 240.

Controllers/processors 240 and 280 may direct the operation at eNB 105 and UE 115, respectively. Controller/processor 240 and/or other processors and modules at eNB 105 may perform or direct the execution of various processes for the techniques described herein. Controllers/processor 280 and/or other processors and modules at UE 115 may also perform or direct the execution illustrated in FIGS. 3 and 4, and/or other processes for the techniques described herein. Memories 242 and 282 may store data and program codes for eNB 105 and UE 115, respectively. Scheduler 244 may schedule UEs for data transmission on the downlink and/or uplink.

In providing wireless communication, such as within a network implementation as shown with respect to wireless network 100, eNB 105 and UE 115 may utilize a multiple carrier (MC) waveform (e.g., OFDMA) or other high peak to average power ratio (PAPR) waveform to facilitate broadband access simultaneously within the network to a plurality of UEs. PAPR may, for example be measured by the distribution (e.g., cumulative distribution function (CDF)) of the ratio of instantaneous power to average power. An example of high PAPR may, for example, comprise the values of the distribution (e.g., CDF) at the 0.1 percentile level for OFDM.

Embodiments of eNB 105 and UE 115 may further be configured to utilize a single carrier (SC) waveform (e.g., discrete Fourier transform-spread-orthogonal frequency division multiplexing (DFT-S-OFDM)) or other low PAPR waveform, such as to facilitate the use of relatively high frequencies (e.g., frequencies on the order of 40 GHz and above). For example, as the carrier frequencies utilized for the wireless communications increases to the millimeter wave (mmW) range, the PAPR associated with the transmission waveform becomes more of a consideration, particularly with respect to low geometry wireless nodes (e.g., wireless nodes that are not disposed in relatively near proximity to one another and/or experience a diminished link signal quality, such as may experience low signal to interference and noise ratio (SINK) with respect to the downlink signal), wireless links experiencing high path loss, etc., generally becomes of higher importance and thus waveforms providing for low PAPR may be utilized.

Consistent with the foregoing, embodiments of wireless network 100 are configured for use of a plurality of different downlink waveforms (e.g., first, second, third, etc. downlink waveforms). For example, embodiments of wireless network 100 are configured for single carrier, low PAPR waveform downlink communication in order to extend the downlink budget, particularly in association with the use of mmW carrier frequencies. Embodiments of wireless network 100 are also configured to utilize multiple carrier, high PAPR waveform downlink communication, such as due to their advantages with respect to median to high geometry UEs (e.g., wireless nodes that are disposed in relatively near proximity to one another and/or experience high link signal quality, such as may experience high SINR with respect to the downlink signal) and multiplexing. Accordingly, eNB 105 and/or UE 115 of embodiments of wireless network 100 are configured to select from a plurality of downlink waveforms (e.g., first, second, third, etc. downlink waveforms) for use in downlink communications based on various considerations. For example, eNB 105 and UE 115 may be configured to support dynamic switching between the various waveforms on the downlink in accordance with the concepts herein. For example, in operation according to embodiments herein, eNB 105 may use different downlink waveforms for different UEs and/or use different downlink waveforms for the same UE (e.g., depending on UE location and channel condition).

In facilitating dynamic switching between the various waveforms on the downlink, embodiments of eNB 105 may utilize the radio resource control (RRC) layer in the air interface control plane to configure a UE for use of a particular downlink waveform. For example, the eNB may make a decision on the downlink waveform, such as based upon the downlink geometry (e.g., the distance between the UE and eNB, the relative signal strength, channel quality, etc.), and RRC configure the UE. It should be appreciated that RRC configure procedures are generally relatively slow and cannot adapt dynamically.

In addition to or in the alternative to the use of RRC, embodiments herein are configured to utilize downlink control information (DCI) to support dynamically switching between the available downlink waveforms. For example, in operation according to embodiments, eNB 105 may make a decision regarding the downlink waveform, such as based upon the downlink geometry (e.g., the distance between the UE and eNB, the relative signal strength, channel quality, etc.), and provide an indication of the dynamic selection of downlink waveform in DCI. In accordance with some embodiments, UE 115 may make a determination regarding a preference with respect to the downlink waveform, such as based upon the downlink geometry (e.g., the distance between the eNB and UE, the relative signal strength, channel quality, etc.), and provide a request for the downlink waveform preference. The eNB may thus make a decision regarding the downlink waveform, taking into account the request made by the UE, and provide an indication of the carrier dynamic selection of downlink waveform in DCI. It should be appreciated that DCI is relatively dynamic, facilitating adaptation of a downlink dynamically, such as may be particularly relevant to operation with respect to beamformed systems where the downlink quality tends to be highly dynamic due to mobility and beam mismatches.

Figure 3:
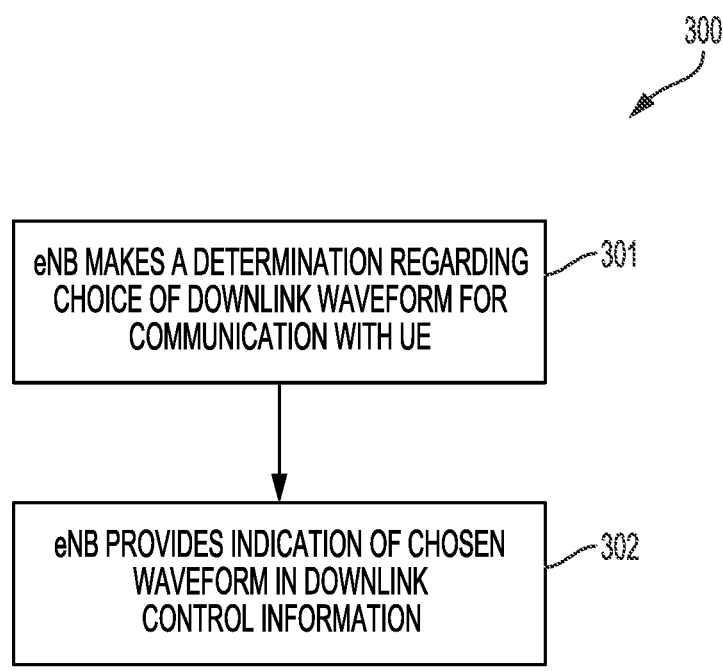
FIGS. 3 and 4 show flow diagrams illustrating operation for implementing dynamic switching of downlink waveforms according to some embodiments of the present disclosure.
Figure 4:
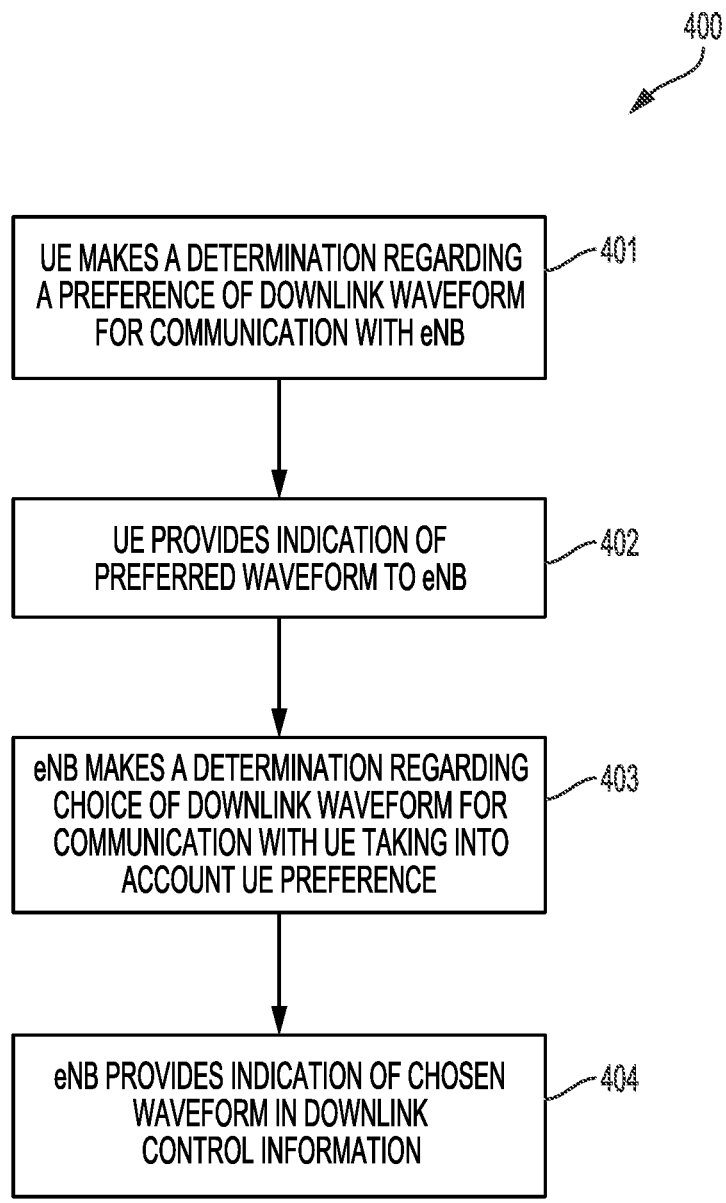

FIGS. 3 and 4 show exemplary flow diagrams of operation for implementing dynamic switching of downlink waveforms, such as for data communication in the PDSCH, according to embodiments herein. In particular, FIG. 3 shows operation wherein an eNB makes a decision regarding the downlink waveform and FIG. 4 shows operation wherein an eNB makes a decision regarding the downlink waveform taking into account a request regarding the selection of downlink waveform made by the UE.

Referring first to FIG. 3, flow 300 shown therein includes block 301 wherein logic of eNB 105 (e.g., control logic of controller/processor 240) operates to make a determination regarding a choice of downlink waveform for communication with UE 115. For example, the logic of eNB 105 may analyze one or more signal received from UE 115 and/or other information regarding the UE to determine one or more attribute of the downlink geometry (e.g., the distance between the eNB and UE may be determined directly from position information reported by the UE and/or other cells in the network, and/or estimated from various metrics such as the relative signal strength, channel quality, etc.). In operation according to embodiments, where it is determined that the downlink geometry is median to high (e.g., the UE is disposed relatively near to the eNB and/or that the downlink signal quality is good), eNB 105 may make a determination to choose a first downlink waveform, such as a high PAPR waveform (e.g., MC waveform), of the waveforms available for downlink communication. However, where it is determined that the downlink geometry is low (e.g., the UE is disposed relatively far from the eNB and/or the downlink signal quality is diminished), eNB 105 of embodiments may operate to make a determination to choose a second downlink waveform, such as a low PAPR waveform (e.g., SC waveform), of the waveforms available for downlink communication.

It should be appreciated that embodiments may additionally or alternatively base determinations regarding a choice of downlink waveform for communication with a UE on information other than the downlink geometry. For example, where a data connection between the eNB and UE has just been initiated, or where no suitable or reliable information regarding downlink geometry is available, embodiments may operate to make a determination to choose a default waveform. Embodiments may, for example, choose a low PAPR waveform (e.g., SC waveform) of the waveforms available for downlink communication in such situations (e.g., to facilitate communications where the downlink geometry, the UE location, and/or the downlink signal quality is unknown). Thus, for example, the system information messages broadcast over the whole cell could always use a low PAPR waveform.

Having made a determination regarding a choice of downlink waveform for communication with a UE, flow 300 of the exemplary embodiment proceeds to block 302 wherein logic of eNB 105 (e.g., control logic of controller/processor 240) operates to provide an indication to the UE regarding the waveform chosen. In operation of block 302 according to embodiments, eNB 105 provides an indication of the selection of downlink waveform in DCI directed to UE 115. It should be appreciated that the downlink waveform selection indication provided according to embodiments herein may comprise an explicit indication of downlink waveform selection and/or may comprise an implied indication of downlink waveform selection. For example, in operation according to an embodiment utilizing an explicit indication of downlink waveform selection, an explicit field in the DCI may be used to indicate the waveform selection, whereby the downlink waveform may be signaled independently from other parameters of the PDSCH. Additionally or alternatively, embodiments may include an express indication of a downlink waveform selection in a random access procedure message (e.g., Msg2 or Msg4) transmitted from the eNB to the UE. In operation according to an embodiment utilizing an implied indication of downlink waveform selection, the downlink waveform decision may additionally or alternatively be bundled with one or more other parameters, such as one or more parameters of the PDSCH (e.g., modulation and coding scheme (MCS) and rank). For example, in operation according to an embodiment utilizing an implied indication of downlink waveform selection, for a grant of rank 1, if the MCS is smaller than a first threshold (X1), and for a grant of rank 2, if MCS is smaller than a second threshold (X2), a low PAPR waveform (e.g., SC waveform) of the available downlink waveforms may be indicated; otherwise a high PAPR waveform (e.g., MC waveform) may be indicated. In operation according to embodiments, the foregoing thresholds may correspond to indexes into a MCS table used to implement particular selected modulation and coding techniques implemented by the UE. Alternatively, the thresholds may be on modulation order (e.g., QPSK and 16 QAM use a low PAPR waveform and higher modulation orders, such as 64 QAM and 256 QAM use a high PAPR waveform.

Referring now to FIG. 4, flow 400 shown therein includes block 401 wherein logic of UE 115 (e.g., logic of controller/processor 280) operates to make a determination regarding a preference with respect to the downlink waveform for communication with eNB 105. For example, the logic of UE 115 may analyze one or more signal received from eNB 105 and/or other information available to the UE to determine one or more attribute of the downlink geometry (e.g., the distance between the UE and eNB may be determined from the UE's position, and/or estimated from various metrics such as the relative signal strength, channel quality, etc.). In operation according to embodiments, where it is determined that the downlink geometry is median to high (e.g., the eNB is disposed relatively near to the UE and/or the downlink signal quality is good), UE 115 may make a determination regarding a preference for a first downlink waveform, such as a high PAPR waveform (e.g., MC waveform), of the waveforms available for downlink communication. However, where it is determined that the downlink geometry is low (e.g., the eNB is disposed relatively far from the UE and/or the downlink single quality is diminished), UE 115 of embodiments may operate to make a determination regarding a preference for a second downlink waveform, such as a low PAPR waveform (e.g., SC waveform), of the waveforms available for downlink communication.

It should be appreciated that embodiments may additionally or alternatively base determinations regarding a preference with respect to downlink waveform for communication with an eNB on information other than the downlink geometry. For example, where a data connection between the UE and eNB has just been initiated, or where no suitable or reliable information regarding the downlink geometry is available, embodiments may operate to make a determination regarding a preference with respect to downlink waveform based upon various considerations relevant to the UE, such as the context of the communication, bandwidth need estimates by the UE, etc. Embodiments may, for example, prefer a high PAPR waveform (e.g., MC waveform) of the waveforms available for downlink communication in situations where high bandwidth demand by the UE is expected. Alternatively, embodiments may prefer a low PAPR waveform (e.g., SC waveform) of the waveforms available for downlink communication in situations where low-bandwidth needs or if the downlink SINR is below a threshold.

Having made a determination regarding a preference with respect to downlink waveform for communication with an eNB, flow 400 of the exemplary embodiment proceeds to block 402 wherein logic of UE 115 (e.g., control logic of controller/processor 280) operates to provide an indication to the eNB regarding the waveform preference. The downlink waveform preference indication provided according to embodiments herein may comprise an explicit indication of downlink waveform preference and/or may comprise an implied indication of downlink waveform preference. For example, in operation according to an embodiment utilizing an explicit indication of downlink waveform preference, an explicit field in the uplink control information (UCI) or medium access control (MAC) control element (CE) may be used to indicate the waveform preference. Embodiments may include an express indication of a UE downlink waveform preference in a random access procedure message (e.g., Msg1 or Msg3) transmitted from the UE to the eNB. In operation according to an embodiment utilizing an implied indication of downlink waveform preference, the downlink waveform decision may additionally or alternatively be bundled with one or more other parameters, such as one or more parameters reported by the UE (e.g., rank and/or channel quality indicator (CQI)). For example, in operation according to an embodiment utilizing an implied indication of downlink waveform preference, when requesting rank 1, if the CQI is smaller than a first threshold (Y1), and when requesting rank 2, if CQI is smaller than a second threshold (Y2), a low PAPR waveform (e.g., SC waveform) of the available downlink waveforms may be indicated; otherwise a high PAPR waveform (e.g., MC waveform) may be indicated.

In operation according to embodiments, although a UE may indicate a preference regarding downlink waveform, a final decision regarding selection of downlink waveform is made by the network (e.g., the eNB). Accordingly, the UE having provided an indication of a preferred downlink waveform, flow 400 of the exemplary embodiment proceeds to block 403 wherein logic of eNB 105 (e.g., control logic of controller/processor 240) operates to make a determination regarding a choice of downlink waveform for communication with UE 115. As with the embodiment of flow 300 of FIG. 3, in operation according to flow 400 of the exemplary embodiment the logic of eNB 105 may analyze one or more signal received from UE 115 and/or other information regarding the UE to determine one or more attribute of downlink geometry (e.g., the distance between the eNB and UE may be determined directly from position information reported by the UE and/or other cells in the network, and/or estimated from various metrics such as the relative signal strength, channel quality, etc.). However, in making a determination regarding the choice of downlink waveform for communication with the UE in operation according to block 403, the eNB further takes into consideration the downlink waveform preference indicated by the UE. In operation according to embodiments, where it is determined that the downlink geometry is median to high (e.g., the UE is disposed relatively near to the eNB and/or the downlink signal quality is good), eNB 105 may make a determination to choose a first downlink waveform, such as a high PAPR waveform (e.g., MC waveform), of the waveforms available for downlink communication. However, where it is determined that the downlink geometry is low (e.g., the UE is disposed relatively far from the eNB and/or the downlink signal quality is diminished), eNB 105 of embodiments may operate to make a determination to choose a second downlink waveform, such as a low PAPR waveform (e.g., SC waveform), of the waveforms available for downlink communication. In operation according to embodiments, the UE preference may be directly followed or may be followed where the eNB determination regarding choice of downlink waveform confirms that the UE preference is viable. Alternatively, the UE preference may be selectively overridden as based upon various considerations, such as whether or not multiple UEs will be frequency division multiplexed and/or other information unknown to the UE when selecting the downlink waveform preference.

Having made a determination regarding a choice of downlink waveform for communication with a UE, flow 400 of the exemplary embodiment proceeds to block 404 wherein logic of eNB 105 (e.g., control logic of controller/processor 240) operates to provide an indication to the UE regarding the waveform chosen. In operation of block 404 according to embodiments, eNB 105 provides an indication of the selection of downlink waveform in DCI directed to UE 115. As with the exemplary embodiment of flow 300, the downlink waveform selection indication provided according to embodiments of flow 400 may comprise an explicit indication of downlink waveform selection and/or may comprise an implied indication of downlink waveform selection. For example, in operation according to an embodiment utilizing an explicit indication of downlink waveform selection may be provided in the DCI. In operation according to an embodiment utilizing an implied indication of downlink waveform selection, the downlink waveform decision may additionally or alternatively be bundled with one or more other parameters, such as one or more parameters of the PDSCH (e.g., modulation and coding scheme (MCS) and rank).

It should be appreciated that, although the examples described above with reference to FIGS. 3 and 4 discuss first and second downlink waveforms, embodiments herein may provide dynamic switching between any appropriate number of downlink waveforms (e.g., first, second, third, etc. downlink waveforms). For example, a third downlink waveform may be utilized with respect to downlink geometry determined to be median, where first and second downlink waveforms may be utilized with respect to downlink geometries determined to be high and low.

As can be appreciated from the example embodiments of FIGS. 3 and 4, the structure and content of the DCI in which the dynamic downlink waveform selection is indicated, whether in an explicit indication of downlink waveform selection or an implied indication of downlink waveform selection, may be different depending upon the downlink waveform selected. Accordingly, UE 115 of embodiments is configured to interpret the DCI differently depending on the downlink waveform selection indication (e.g., one or more fields of the DCI may be interpreted or reinterpreted based upon the downlink waveform selection). For example, interpretation of the resource block (RB) allocation field of the DCI may be affected depending upon the downlink waveform selection. As a specific example, embodiments may use different RB allocation modes with respect to the different downlink waveforms (e.g., continuous RB allocation may be utilized with respect to a SC waveform, preferably in combination with an non-arbitrary number of RBs, such as a multiple of 2, 3 or 5 similar to LTE uplink, whereas resource block groups (RBGs) comprising arbitrary numbers of RBs may be utilized with respect to a MC waveform). As another example, the DCI field to define a demodulation reference signal (DMRS) pattern as DMRS may be different with respect to a high PAPR waveform (e.g., MC waveform) and a low PAPR waveform (e.g., SC waveform). In operation according to embodiments, MCS information (e.g., MCS table used to implement particular selected modulation and coding techniques implemented by the UE) may be defined differently depending upon the downlink waveform selected, such as in an implementation where an explicit indication of downlink waveform selection is provided to the UE for indicating the applicable MCS information. As still another example, the channel state information reference signal (CSI-RS) may be take different forms in the different downlink waveforms and thus the CSI-RS indication in the DCI may be interpreted differently depending upon the downlink waveform selected.

In light of the foregoing, a UE configured in accordance with embodiments herein may operate to detect an indication of the chosen downlink waveform in the DCI and proceed to interpret and/or reinterpret various fields of the DCI based upon the downlink waveform selection indicated. For example, the UE may detect an explicit indication of downlink waveform selection and/or an implied indication of downlink waveform selection in the DCI and access information (e.g., a downlink waveform parameter lookup table (LUT) stored in memory 282) to determine various attributes with respect to the downlink waveform selection (e.g., the particular downlink waveform selected by the indication, the appropriate interpretation of one or more DCI fields for the selected downlink waveform, etc.).

Despite possible differences with respect to the DCI in association with the different downlink waveforms, embodiments are configured to nevertheless keep the DCI length under different waveform choices to be the same, such as to avoid using different blind decodings. Accordingly, the DCI may include padding bits (e.g., zero padding) to maintain the same length DCI as between the various different downlink waveforms supported by the wireless communication system. Embodiments, rather than padding DCI with arbitrary padding bits (e.g., zero padding), may operate to utilize padding bits that are a function of the DCI data bits (e.g., padding bits based on bits of one or more other fields in the DCI to provide cyclic redundancy check (CRC) type functionality). In operation according to embodiments implementing padding bits that are a function of the DCI data, DCI bits utilized to provide the indication of the downlink waveform selected (whether in an explicit indication of downlink waveform selection or an implied indication of downlink waveform selection) are not included in the DCI bits from which the padding bits are derived, such as to facilitate determining if the selected downlink waveform is one for which padding bits that are a function of the DCI data are present. The bit redundancy check (e.g., CRC check) using the padding bits may, for example, be applied with respect to the appropriate fields of the DCI if the downlink waveform is determined to be the one for which padding bits that are a function of the DCI data are present.

Embodiments of eNB 105 may implement outer loop link adaptation for providing self-optimization. For example, an outer loop link adaptation algorithm may be based upon PDSCH decoding and used to control block error ratio (BLER) to a target percentage (e.g., 10%) by applying a backoff to the CQI report to select MCS. Such outer look link adaptation algorithms may be configured for dynamic switching between downlink waveforms, such as to further base the link adaptation on the downlink waveform selected (e.g., control BLER to a target percentage by applying a backoff to the CQI report based upon the particular downlink waveform selected to select MCS). An outer loop link adaptation algorithm of embodiments of a dynamic downlink waveform switching implementation may, for example, split the outer loop for different ones of the downlink waveforms supported by the dynamic switching implementation. Accordingly, different outer loop backoffs may be maintained and applied depending on the downlink waveform selection. In operation according to embodiments, although a same CQI reported from the UE (e.g., translated from SNR), decoding error events of one downlink waveform drive the backoff of that waveform link adaptation and MCS selection of a downlink waveform uses the backoff of that waveform, in addition to the CQI feedback common to the various downlink waveforms. In another embodiment, the backoff is applied to the CQI by the UE before reporting, based on outer loops maintained at the UE, and the UE maintains a separate outer loop for each downlink waveform type.

Embodiments implementing dynamic switching between downlink waveforms support automatic repeat request (ARQ) based retransmission of lost or corrupted downlink data. In particular, embodiments of eNB 105 and UE 115 implement hybrid ARQ (HARQ). In operation according to embodiments herein implementing dynamic switching between downlink waveforms, HARQ retransmissions are supported in different downlink waveforms (e.g., data retransmission need not be provided using a same downlink waveform as the original transmission of the lost or corrupted data). Such HARQ retransmission using different downlink waveforms may be supported according to concepts herein without introducing extra complexity in the DCI design. For example, in retransmission, the same HARQ process ID may be used with new data indicator (NDI) not flipped, but the other type of downlink waveform indicated. In operation according to embodiments, the HARQ redundancy version (RV) index may be utilized to signal the downlink waveform utilized with respect to the retransmitted data. In an exemplary implementation supporting HARQ, downlink data transmission may be provided to a single UE using a low PAPR waveform (e.g., SC waveform) wherein some code block group (CBG) of the transmission fails. The UE may provide ACK/NACK feedback to the eNB indicating the CBG transmission failure and the CBG may be retransmitted using the same or different downlink waveform (e.g., using the same downlink waveform for a first retransmission and a different downlink waveform for a subsequent retransmission, using a different downlink waveform for the initial retransmission, etc.). In another exemplary implementation supporting HARQ, downlink data transmission may be provided to multiple UEs using a high PAPR waveform (e.g., MC waveform) wherein transmission of some CBG (e.g., one or more CBGs not requiring the full bandwidth for retransmission) fails. The UE may provide ACK/NACK feedback to the eNB indicating the CBG transmission failure and the CBG may be retransmitted to the UE using a low PAPR waveform (e.g., SC waveform) to be efficient. In operation of such an embodiment, transmission of data to the other UEs of the multiple UEs using a high PAPR waveform may likewise be switched to the low PAPR waveform, such as during the above mentioned retransmission of data using the low PAPR waveform to the UE. In accordance with embodiments, when the outer loop targets a desired PDSCH BLER after N HARQ transmissions, and these N transmissions could use different waveforms, then separate outer loops may be maintained corresponding to all or a subset of possible combinations of the waveform types that could be used on these N transmissions. For example, to reduce complexity, a set of independent outer loops may be maintained corresponding only to the possible downlink waveform choices for the first HARQ transmission.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIG. 2 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for switching communication link waveforms in a wireless communication system, the method comprising:
   determining whether to utilize a multiple carrier (MC) waveform or a single carrier (SC) waveform as a communication link waveform for semistatic data communication from a first device to a second device; and
   utilizing a radio resource control (RRC) layer in an air interface control plane to configure the second device according to the determined communication link waveform, wherein one or more fields of downlink control information (DCI) that indicate information distinct from an indication of the determined communication link waveform are interpreted based on one or more waveform parameter values included in the one or more fields and based on the determined communication link waveform.

2. The method of claim 1, further comprising:
   dynamically deciding whether to change the determined communication link waveform to the other of: the MC waveform or the SC waveform; and
   upon deciding to change the determined communication link waveform, signaling an expressed indication of the decided other waveform in an explicit field the DCI.

3. The method of claim 1, wherein whether to utilize the MC waveform or the SC waveform as a communication link waveform for data communication from the first device to the second device is determined at least in part based upon one or more other parameters comprising at least one of: a rank, a modulation and coding scheme (MCS), or a redundancy version index.

4. The method of claim 1,
wherein a first field of the one or more fields of the DCI is interpreted as having:
a first value based on a first waveform parameter included in the first field having a first waveform parameter value and the determined communication link waveform being the MC waveform; and
a second value based on the first waveform parameter having the first waveform parameter value and the determined communication link waveform being the SC waveform.

5. The method of claim 1, wherein an outer loop link adaptation algorithm maintains a target block error ratio (BLER) for packets transmitted using the MC and SC waveforms.

6. The method of claim 1, further comprising:
switching between the determined communication link waveform and another waveform for retransmission of data.

7. The method of claim 1, wherein whether to utilize the MC waveform or the SC waveform is determined for use as a downlink communication link waveform for the semistatic data communication by logic of an access point in the wireless communication system.

8. The method of claim 1, further comprising:
determining a relative distance between the first device in the wireless communication system and the second device in the wireless communication system, wherein whether to utilize the MC waveform or the SC waveform as a communication link waveform for data communication from the first device to the second device is determined at least in part based upon the relative distance between the first device and the second device.

9. A method for switching communication link waveforms in a wireless communication system, the method comprising:
determining whether to utilize a multiple carrier (MC) waveform or a single carrier (SC) waveform as a communication link waveform for semistatic data communication from a first device to a second device, wherein retransmission of data uses a different waveform than the determined communication link waveform; and
utilizing a radio resource control (RRC) layer in an air interface control plane to configure the second device according to the determined communication link waveform.

10. The method of claim 9, further comprising:
dynamically deciding whether to change the determined communication link waveform to the other of: the MC waveform or the SC waveform; and
upon deciding to change the determined communication link waveform, signaling an expressed indication of the decided other waveform in an explicit field of downlink control information (DCI).

11. The method of claim 9, wherein whether to utilize the MC waveform or the SC waveform as a communication link waveform for data communication from the first device to the second device is determined at least in part based upon one or more other parameters comprising at least one of: a rank, a modulation and coding scheme (MCS), or a redundancy version index.

12. The method of claim 9, further comprising:
receiving an indication of the communication link waveform preference of the second device, wherein whether to utilize the MC waveform or the SC waveform as a communication link waveform for data communication from the first device to the second device is determined at least in part based upon the communication link waveform preference of the second device.

13. The method of claim 9, wherein an outer loop link adaptation algorithm maintains a target block error ratio (BLER) for packets transmitted using the MC and SC waveforms.

14. The method of claim 9, wherein whether to utilize the MC waveform or the SC waveform is determined by logic of an access point in the wireless communication system.

15. The method of claim 9, further comprising:
determining a relative distance between the first device in the wireless communication system and the second device in the wireless communication system, wherein whether to utilize the MC waveform or the SC waveform as a communication link waveform for data communication from the first device to the second device is determined at least in part based upon the relative distance between the first device and the second device.

16. A method for switching communication link waveforms in a wireless communication system, the method comprising:
determining whether to utilize a multiple carrier (MC) waveform or a single carrier (SC) waveform as a communication link waveform for semistatic data communication from a first device to a second device, wherein an outer loop link adaptation algorithm maintains a target block error ratio (BLER) for packets transmitted using the MC and SC waveforms; and
utilizing a radio resource control (RRC) layer in an air interface control plane to configure the second device according to the determined communication link waveform.

17. The method of claim 16, further comprising:
dynamically deciding whether to change the determined communication link waveform to the other of: the MC waveform or the SC waveform; and
upon deciding to change the determined communication link waveform, signaling an expressed indication of the decided other waveform in an explicit field of downlink control information (DCI).

18. The method of claim 16, wherein whether to utilize the MC waveform or the SC waveform as a communication link waveform for data communication from the first device to the second device is determined at least in part based upon one or more other parameters comprising at least one of: a rank, a modulation and coding scheme (MCS), or a redundancy version index.

19. The method of claim 16, further comprising:
receiving an indication of the communication link waveform preference of the second device, wherein whether to utilize the MC waveform or the SC waveform as a communication link waveform for data communication from the first device to the second device is determined at least in part based upon the communication link waveform preference of the second device.

20. The method of claim 16, further comprising:
switching between the determined communication link waveform and another waveform for retransmission of data.

21. The method of claim 16, wherein whether to utilize the MC waveform or the SC waveform is determined by logic of an access point in the wireless communication system.

22. The method of claim 16, further comprising:
  determining a relative distance between the first device in the wireless communication system and the second device in the wireless communication system, wherein whether to utilize the MC waveform or the SC waveform as a communication link waveform for data communication from the first device to the second device is determined at least in part based upon the relative distance between the first device and the second device.

23. A method for switching communication link waveforms in a wireless communication system, the method comprising:
  determining whether to utilize a multiple carrier (MC) waveform or a single carrier (SC) waveform as a communication link waveform for semistatic data communication from a first device to a second device, wherein whether to utilize the MC waveform or the SC waveform as a communication link waveform for data communication from the first device to the second device is determined at least in part based upon a relative distance between the first device and the second device; and
  utilizing a radio resource control (RRC) layer in an air interface control plane to configure the second device according to the determined communication link waveform.

24. The method of claim 23, further comprising:
  dynamically deciding whether to change the determined communication link waveform to the other of: the MC waveform or the SC waveform; and
  upon deciding to change the determined communication link waveform, signaling an expressed indication of the decided other waveform in an explicit field in control information of a control channel.

25. The method of claim 23, wherein whether to utilize the MC waveform or the SC waveform as a communication link waveform for data communication from the first device to the second device is determined at least in part based upon one or more other parameters comprising at least one of: a rank, a modulation and coding scheme (MCS), or a redundancy version index.

26. The method of claim 23, further comprising:
  receiving an indication of the communication link waveform preference of the second device, wherein whether to utilize the MC waveform or the SC waveform as a communication link waveform for data communication from the first device to the second device is determined at least in part based upon the communication link waveform preference of the second device.

27. The method of claim 23, wherein an outer loop link adaptation algorithm maintains a target block error ratio (BLER) for packets transmitted using the MC and SC waveforms.

28. The method of claim 23, wherein one or more fields of downlink control information (DCI) are interpreted based upon the determined communication link waveform.

29. The method of claim 23, further comprising:
  switching between the determined communication link waveform and another waveform for retransmission of data.

30. The method of claim 1, wherein the one or more fields of the DCI that are interpreted based on the one or more waveform parameter values and based on the determined communication link waveform comprise a resource block (RB) allocation field, a demodulation reference signal (DMRS) pattern field, a modulation and coding scheme (MCS) field, a channel state information reference signal (CSI-RS) field, or a combination thereof.

* * * * *